(12) United States Patent
Shin (10) Patent No.: US 9,789,740 B2
(45) Date of Patent: Oct. 17, 2017

(54) TIRE PRESSURE MONITORING SYSTEM AND APPARATUS AND METHOD FOR CONTROLLING THE SAME

(71) Applicant: HYUNDAI MOTOR COMPANY, Seoul (KR)

(72) Inventor: Wook Jin Shin, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/147,060

(22) Filed: May 5, 2016

(65) Prior Publication Data

US 2017/0166020 A1   Jun. 15, 2017

(30) Foreign Application Priority Data

Dec. 10, 2015 (KR) ........................ 10-2015-0175757

(51) Int. Cl.
*B60C 23/00* (2006.01)
*B60C 23/04* (2006.01)
*G08B 21/18* (2006.01)

(52) U.S. Cl.
CPC ...... *B60C 23/0474* (2013.01); *B60C 23/0433* (2013.01); *B60C 23/0486* (2013.01); *G08B 21/182* (2013.01)

(58) Field of Classification Search
CPC ... B60C 23/00; B60C 23/001; B60C 23/0408; B60C 23/007; B60C 23/02; B60C 23/04; B60C 23/061; B60C 23/20; B60C 23/0433; B60C 23/0474; B60C 23/0486
See application file for complete search history.

(56) References Cited

U.S. PATENT DOCUMENTS

| 5,710,539 A * | 1/1998 | Iida | B60C 23/061 |
| | | | 116/34 R |
| 5,936,519 A * | 8/1999 | Nakajima | B60C 23/061 |
| | | | 116/34 R |
| 6,850,155 B1 * | 2/2005 | McQuade | B60C 23/0408 |
| | | | 340/442 |
| 6,982,636 B1 * | 1/2006 | Bennie | B60C 23/0408 |
| | | | 340/438 |

(Continued)

FOREIGN PATENT DOCUMENTS

| JP | 2004-268612 A | 9/2004 |
| JP | 2005-254927 A | 9/2005 |

(Continued)

OTHER PUBLICATIONS

Korean Notice of Allowance issued in Application No. 10-2015-0175757 dated Aug. 22, 2017, with English translation.

*Primary Examiner* — Van Trieu
(74) *Attorney, Agent, or Firm* — McDermott Will & Emery LLP (57) ABSTRACT

A method for controlling a tire pressure monitoring system (TPMS) in a vehicle includes: measuring an air pressure of each tire included in the vehicle; and determining whether the air pressure of at least one tire is lower than a warning threshold level. When the at least one tire has a lower pressure than the warning threshold level, a warning sign is provided regarding a tire having a hysteresis air pressure which is ranged between the warning threshold level and a normal pressure level.

20 Claims, 5 Drawing Sheets

(56) References Cited

U.S. PATENT DOCUMENTS

| | | | |
|---|---|---|---|
| 6,985,076 B1* | 1/2006 | Bennie | B60C 23/0416 340/442 |
| 7,026,922 B1* | 4/2006 | Talukder | B60C 23/009 340/442 |
| 2005/0200464 A1* | 9/2005 | Bennie | B60C 23/0408 340/442 |
| 2005/0275517 A1* | 12/2005 | Tsukamoto | B60C 23/0408 340/442 |
| 2006/0010961 A1* | 1/2006 | Gibson | B60C 23/0408 73/40 |
| 2006/0015225 A1* | 1/2006 | McQuade | B60C 23/0408 701/32.9 |

FOREIGN PATENT DOCUMENTS

| | | |
|---|---|---|
| JP | 2005-324634 A | 11/2005 |
| JP | 2009-149247 A | 7/2009 |
| JP | 4640501 B2 | 3/2011 |
| JP | 2012-171464 A | 9/2012 |
| KR | 10-2015-0068250 A | 6/2015 |

* cited by examiner

TIRE PRESSURE MONITORING SYSTEM AND APPARATUS AND METHOD FOR CONTROLLING THE SAME

CROSS-REFERENCE TO RELATED APPLICATION

This application claims the benefit of priority to Korean Patent Application No. 10-2015-0175757, filed on Dec. 10, 2015 in the Korean intellectual Property Office, the disclosure of which is hereby incorporated by reference as if fully set forth herein.

TECHNICAL FIELD

The disclosure relates to a tire pressure monitoring system (TPMS) and an apparatus and a method for controlling the TPMS, and more particularly, to an apparatus and a method for controlling a TPMS to avoid an error on the TPMS.

BACKGROUND

A tire pressure monitoring system (TPMS), e.g., an electronic system designed to monitor an air pressure inside pneumatic tires on various types of vehicles, can support comfort and safety driving environment. Air pressure of each tire can be inspected for basic pre-driving inspection, and can improve tire durability, riding quality, braking power, fuel efficiency, and so on. If the air pressure of tire is dramatically beyond a recommended range, the tire may be worn fast and be damaged or destroyed finally. When the damage on the tire is severe, the air pressure inside a tire can cause a traffic accident. It is desired that a driver should check air pressure inside each tire before driving, but checking the air pressure inside each tire might not be easy. Thus, the TPMS included in a vehicle is widely used to give the driver a warning sign when at least one air pressure inside tires is beyond the recommended range.

The TPMS may include a sensor for automatically detecting an air pressure, a temperature, and the like inside each tire. Information collected by the sensor is provided to a driver via a head unit (e.g., a dashboard) so that the driver can check the air pressure inside the tires real-time. The warning sign provided by the TPMS reminds the driver, who doesn't pay attention on a status of tires, for tire checkup. Recently, it is required for vehicles being equipped with the TPMS in many countries.

The sensor included in the TPMS is capable of sensing air pressure and temperature inside the tires. Since the air pressure is proportional to the temperature according to the ideal gas law (i.e., PV=nRT, where P is pressure, V is volume, n is amount in moles, R is ideal gas constant, and T is temperature of the gas, respectively), the air pressure can vary with the temperature. Because temperature inside the tires can vary with operating environment such as season, ambient temperature, or the like, the air pressure inside the tires can be changed. Further, the air pressure inside the tires can be altered because the temperature inside tires can rise because of friction while the vehicle operates. It is important to provide the driver with information regarding the air pressure inside each tire, which varies continuously, may be valuable, but the driver can be distracted when a warning sign is frequently turned on or off in response to the changed air pressure inside the tires.

SUMMARY

An apparatus and a method for enhancing a tire pressure monitoring system (TPMS) included in a vehicle can determine whether an air pressure inside each tire is in a predetermined range to avoid making a wrong decision, e.g., determining that, while a warning sign for an tire on the vehicle is turned on, another tire having a lower air pressure than the tire is considered a normal tire.

Further, when there is a warned tire among tires which are deformed and restored periodically by touching the ground while a vehicle operates, an apparatus and a method for use in a vehicle can avoid an error in determining states of the tires when air pressures inside the tires rise because of hysteresis loss, and inform a driver of an accurate information regarding the air pressures inside the tires.

According to an embodiment in the present disclosure, a method for controlling a tire pressure monitoring system (TPMS) in a vehicle includes: measuring an air pressure of each tire included in the vehicle; and determining whether the air pressure of at least one tire is lower than a warning threshold level. When the at least one tire has a lower pressure than the warning threshold level, a warning sign can be provided regarding a tire having a hysteresis air pressure which is ranged between the warning threshold level and a normal pressure level.

Even if an air pressure inside a tire increases from a lower level to a higher level than the warning threshold level while the vehicle operates, the warning sign is given regarding the tire having the hysteresis air pressure.

The method can further include releasing the warning sign regarding the tire when an air pressure inside the tire is beyond the normal pressure level.

The method can further include releasing the warning sign regarding the tire having the hysteresis air pressure when there is no tire having an air pressure lower than the warning threshold level.

The normal pressure level can be lower than a recommended pressure level regarding each tire included in the vehicle as well as higher than the sum of the warning threshold level and a pressure level increased by Hysteresis loss while the vehicle travels.

In the method, the measuring the air pressure of each tire can be periodically repeated from a time point at which an engine starts to a time point at which the engine is off.

The air pressure of each tire can be measured by a temperature pressure sensor engaged with each tire.

The warning sign can be displayed on at least one of a dashboard and a screen of multimedia system included in the vehicle.

The warning sign can be shown with a number indicating the air pressure inside the tire, which includes at least one of a color, a symbol, a sound and a text distinguishable from a normal sign provided to a tire having a higher air pressure than the normal pressure level.

According to another embodiment in the present disclosure, an apparatus controls a tire pressure monitoring system (TPMS) engaged with an automotive electronics system, which comprises a processor that comprises at least one data processor and at least one non-transitory computer-readable memory storing a computer program. The processor causes the apparatus to measure an air pressure of each tire included in the vehicle, and determine whether an air pressure of at least one tire is lower than a warning threshold level. If the at least one tire has a lower pressure than the warning threshold level, the processor causes the apparatus to provide a warning sign regarding a tire having a hysteresis air pressure which is ranged between the warning threshold level and a normal pressure level.

The processor further causes the apparatus to release the warning sign regarding the tire having the hysteresis air pressure when there is no tire having an air pressure lower than the warning threshold level.

According to another embodiment in the present disclosure, tire pressure monitoring system (TPMS) in a vehicle include: plurality of sensors, each sensor configured to measure an air pressure inside a tire engaged with the respective sensor; a receiver configured to collect the air pressure from the plurality of sensors and transmit collected pressure values; and a controller configured to determine whether the air pressure inside each tire is lower than a warning threshold level based on the collected values delivered from the receiver. When the at least one tire has a lower pressure than the warning threshold level, the controller provides a warning sign regarding a tire having a hysteresis air pressure which is ranged between the warning threshold level and a normal pressure level.

Even when an air pressure of a tire increases from a lower level to a higher level than the warning threshold level while the vehicle operates, the controller can provide the warning sign regarding the tire having the hysteresis air pressure.

The controller can release the warning sign regarding the tire when an air pressure inside the tire is beyond the normal pressure level.

The controller can release the warning sign regarding the tire having the hysteresis air pressure when there is no tire having an air pressure lower than the warning threshold level.

The normal pressure level can be lower than a recommended pressure level regarding each tire included in the vehicle and higher than the sum of the warning threshold level and a pressure level increased by hysteresis loss while the vehicle operates.

The plurality of sensors can measure the air pressure inside tires periodically while an engine is on.

The plurality of sensors can be coupled to the receiver via a wireless local area network.

The warning sign can be shown via at least one of a dashboard and a screen of multimedia system included in the vehicle.

The warning sign can be shown with a number indicating the air pressure inside the tire, which includes at least one of a color, a symbol, a sound and a text distinguishable from a normal sign provided to a tire having a higher air pressure than the normal pressure level.

BRIEF DESCRIPTION OF THE DRAWINGS

The accompanying drawings, which are included to provide a further understanding of the invention and are incorporated in and constitute a part of this application, illustrate embodiment (s) of the invention and together with the description serve to explain the principle of the invention.

DETAILED DESCRIPTION

Reference will now be made in detail to the exemplary embodiments in the present disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the invention, certain detailed explanations of related art are omitted when it is deemed that they may unnecessarily obscure the essence of the invention. The features of the invention will be more clearly understood from the accompanying drawings and should not be limited by the accompanying drawings. It is to be appreciated that all changes, equivalents, and substitutes that do not depart from the spirit and technical scope of the invention are encompassed in the invention.

FIGS. 1A-1D describe exemplary situations for a conventional tire pressure monitoring system (TPMS) included in a vehicle. Particularly, FIGS. 1A-1D describe plural situations happened according to the change of air pressures inside the tires when the vehicle equipped with tires operates. Each situation described may occur randomly, not sequentially. But, for the purpose of showing possible issues or problem in the TPMS, it is assumed that the situations shown in FIGS. 1A-1D are incurred sequentially.

In FIGS. 1A-1D, it is assumed that a warning threshold level of tires is 25 and a normal pressure level 30. Herein, the normal pressure level can be considered a reference level where a tire is released from a warning sign. Further, it is assumed that a recommended pressure level of tire is 32. These pressure numbers indicating the air pressure inside the tire can be subject to may be in a pound force per square inch (PSI) or Kg/cm². For example, 30 psi can be considered about 2.1 to 2.2 Kg/cm² using the following equation.

$$Y(\text{psi}) = X(\text{kg/cm}^2) \times 14.22,$$

where Y and X are positive numbers.

Figure 1A:
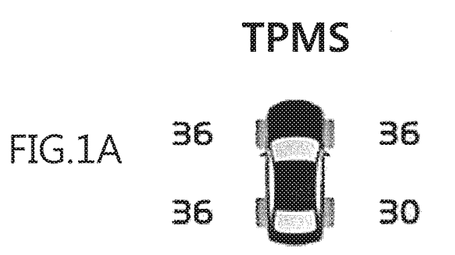
FIGS. 1A-1D describe exemplary error situations of a tire pressure monitoring system (TPMS) included in a vehicle according to a related art.

Referring to FIG. 1A, after a vehicle travels for a predetermined distance, air pressures inside front tires increase up to 36 psi. However, an air pressure inside a right rear tire is 30 psi while an air pressure inside a left rear tire is 36 psi. Though the right rear tire has 30 p (air pressure), a warning sign is not provided to a driver because all tires including the right rear tire have higher air pressures than the warning threshold level (25 psi).

Figure 1B:
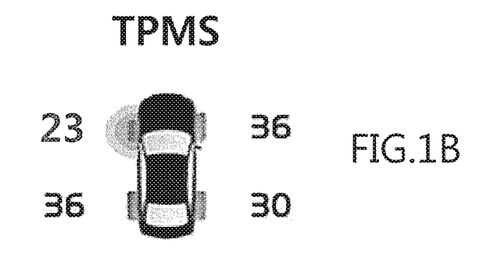

Referring to FIG. 1B, the air pressure inside the left front tire decreases to 23 psi. In this case, since the left front tire has a lower air pressure than the warning threshold level (i.e., 23 psi<25 psi), the warning sign is given regarding the left front tire. However, because other three tires have a higher air pressure than the warning threshold level, the warning sign is not provided for those three tires.

Figure 1C:
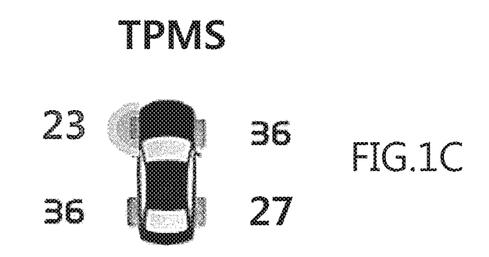

Referring to FIG. 1C, an air pressure inside the right rear tire decreases to 27 psi. However, since the right rear tire still has a higher air pressure than the warning threshold level (i.e., 27 psi>25 psi), the warning sign is not provided for the right rear tire.

Figure 1D:
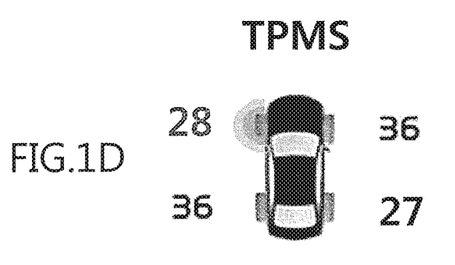

As shown in FIG. 1D, an air pressure inside the left front tire increase up to 28 psi. Although the left front tire has a lower air pressure than the normal pressure level (i.e. 28 psi<30 psi), the warning sign given regarding the left front tire is not released and is maintained. Here, the left front tire has a higher air pressure than the right rear tire. However, the warning sign is not provided to the driver for all the tires.

Herein, a range between the warning threshold level and the normal pressure level is referred as to a hysteresis loss section. An air pressure inside a tire while a vehicle operates can increase because temperature around the tire increases. However, even if an air pressure inside a warned tire having a lower air pressure than the warning threshold level increases beyond the warning threshold level while the vehicle operates, a warning sign can be still given as long as the air pressure inside the warned tire is higher than the normal pressure level.

Referring to FIG. 1D, the warning sign is still given regarding the left front tire having an air pressure lower than the warning threshold level before but higher than the warning threshold level after the vehicle operates for a predetermined period of time. However, there is no warning sign for the right rear tire having a lower air pressure than the left front tire while there is the warning sign for the left front tire, even if the air pressure in the right rear re higher than the warning threshold level. This might confuse the driver. When the warning sign is given regarding any tire included in the vehicle, the TPMS shows the situation which a tire having a relatively lower air pressure than another tire is considered being normal while the other tire having a relatively higher air pressure is considered abnormal (i.e., low pressure) when these tires have air pressures in the hysteresis loss section.

Figure 2:
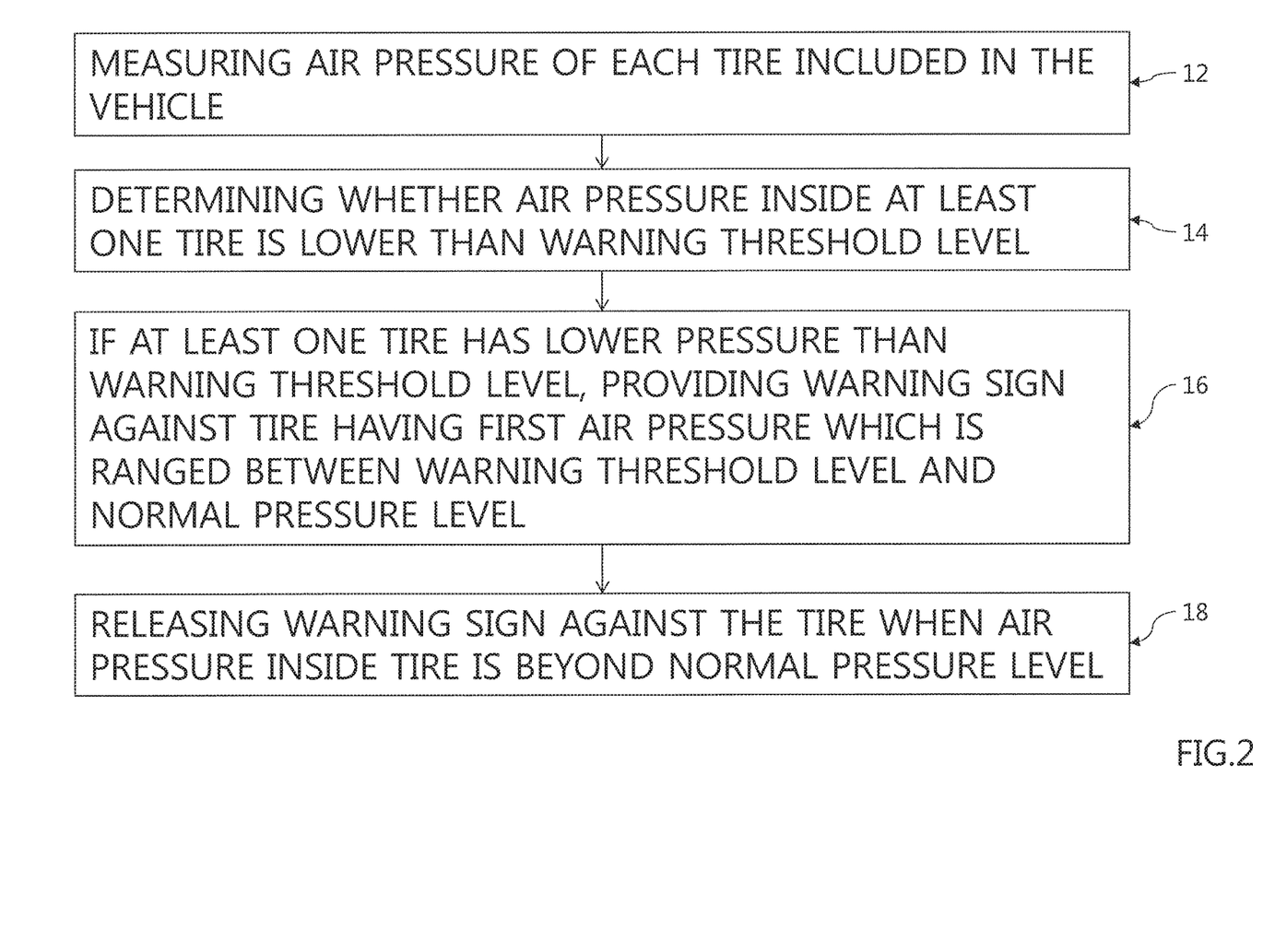
FIG. 2 shows a method for controlling a TPMS according to the present disclosure.

FIG. 2 shows a method for controlling a tire pressure monitoring system (TPMS) according to the present disclosure.

A method for controlling a TPMS according to the present disclosure includes: measuring an air pressure of each tire included in a vehicle (step 12); determining whether the air pressure inside at least one tire is lower than a warning threshold level (step 14); and when the at least one tire has a lower pressure than the warning threshold level, providing a warning sign, regarding a tire having a hysteresis air pressure which is ranged between the warning threshold level and a normal pressure level (step 16). Herein, the hysteresis air pressure may be within the hysteresis loss section.

Further, while the vehicle operates, even if an air pressure inside a tire increases from a lower level to a higher level than the warning threshold level, the warning sign can be shown regarding the tire having the hysteresis air pressure.

The method may further include releasing the warning sign regarding the tire when an air pressure inside the tire is beyond the normal pressure level (step 18).

The method may further include releasing the warning sign regarding the tire having the hysteresis air pressure when there is no tire having an air pressure lower than the warning threshold, level.

The step of measuring the air pressure of each tire may periodically repeat from a time point at which an engine starts to a time point at which the engine is off. For example, the air pressure of each tire can be measured every 30 seconds or every 1 minute. Further, the air pressure of each tire can be determined by a temperature pressure sensor engaged with each tire. When each tire is equipped with each temperature pressure sensor, each temperature pressure sensor measures and transmits a temperature and an air pressure via a wireless communication technique.

The warning sign outputted from the TPMS can be shown via at least one of a dashboard and a screen of multimedia system included in the vehicle.

A portable terminal including a receiver for receiving wireless signals that are transmitted from the temperature pressure sensor may be used to show the warning sign. If a driver has a mobile device which includes a vehicle engagement application for receiving information about temperature and air pressure inside tires, the vehicle engagement application may determine whether a warning sign is provided for each tire based on a comparison result of the measured air pressure inside each tire and the warning threshold level.

The warning sign shown to the driver (or a user) may include a number indicating an air pressure value inside the tire. Further, the warning sign may include at least one of a color, a symbol, a sound, and a text, which are distinguishable from those of a normal sign regarding another tire having a higher air pressure than the normal pressure level.

As described above, the method for controlling the TPMS can provide the warning sign regarding all tires having a lower air pressure than the normal pressure level when at least one of the tires has lower air pressure than the warning threshold level. Further, when the warning sign is given regarding at least one tire, only a tire having a higher air pressure than the normal pressure level can be considered normal. If there is no tire having a lower air pressure than the warning threshold level, the warning sign given regarding the tire having a higher air pressure than the normal pressure level can be released. In this case, the warning sign regarding any tire having an air pressure ranged between the warning threshold level and the normal pressure level can be maintained.

In order to determine whether an air pressure inside each tire is normal or low, the above described method for controlling the TPMS included in the vehicle can avoid an issue that a tire having a higher air pressure than another tire is considered to be low when the other tire is considered normal.

Figure 3:
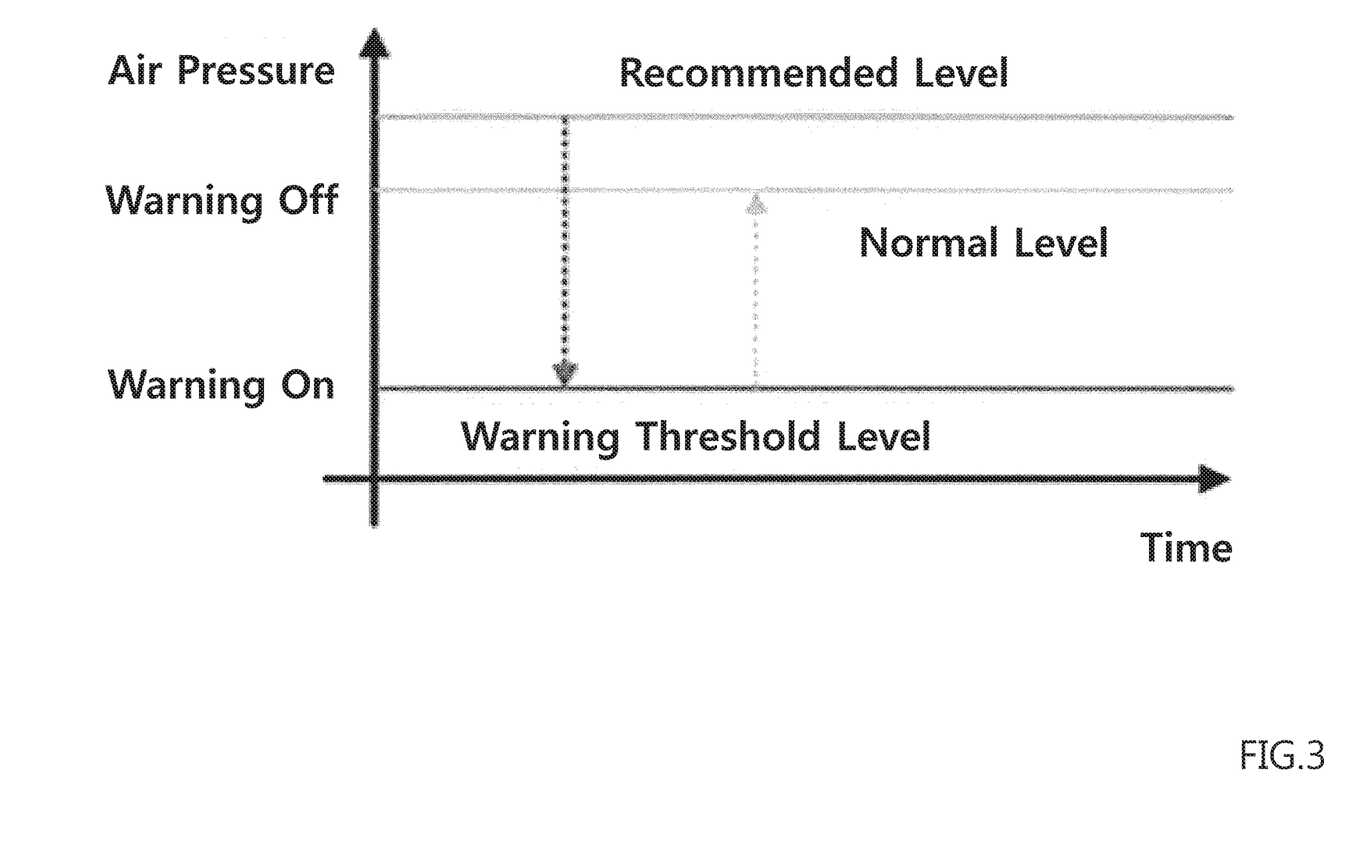
FIG. 3 describes determining reference values applicable to a TPMS according to the present disclosure.

FIG. 3 describes determining reference values applicable to a tire pressure monitoring system (TPMS) according to the present disclosure.

As shown, there is a recommended pressure level for a tire included in a vehicle. The recommended pressure level can be determined based on a vehicle feature, a tire feature, a circumstantial element (e.g., weather, temperature), and so on. For driving safety, a vehicle manufacturer can suggest the recommended pressure level for each vehicle. If an air pressure inside a tire is far higher or lower than the recommended pressure level, the tire may not be controlled properly while the vehicle operates, and driving safety can be deter orated.

Even though a driver or a user sets an air pressure inside a tire as the recommended pressure level, the air pressure inside the tire can decrease as time elapses due to various reasons. When the air pressure inside the tire is lower than the warning threshold level which is a criterion for determining whether a tire having a lower air pressure has an effect on driving safety, the TPMS can display the warning sign.

Herein, the normal pressure level can be lower than the recommended pressure level at each tire included in the vehicle as well as higher than the sum of the warning threshold level and a pressure level increased by hysteresis loss while the vehicle operates. Here, the normal pressure level means that the tire may not threaten driving safety though having a lower air pressure than the recommended pressure level. It can be determined that the normal pressure level can be higher or equal to the pressure level increased by hysteresis loss from the warning threshold level. Thus, it is prevented that the warning sign for a tire having a lower air pressure than the warning threshold level can be maintained even when the air pressure inside the tire increases because of hysteresis loss while the vehicle operates.

For example, when a temperature increases, an air pressure inside a tire may increase by 4 psi when a vehicle operates for over 2 km distance under a normal driving condition. Accordingly, when the recommended pressure level is 32 psi and the warning threshold level is 25 psi, the normal pressure level can be set to be 30 psi.

Figure 4:
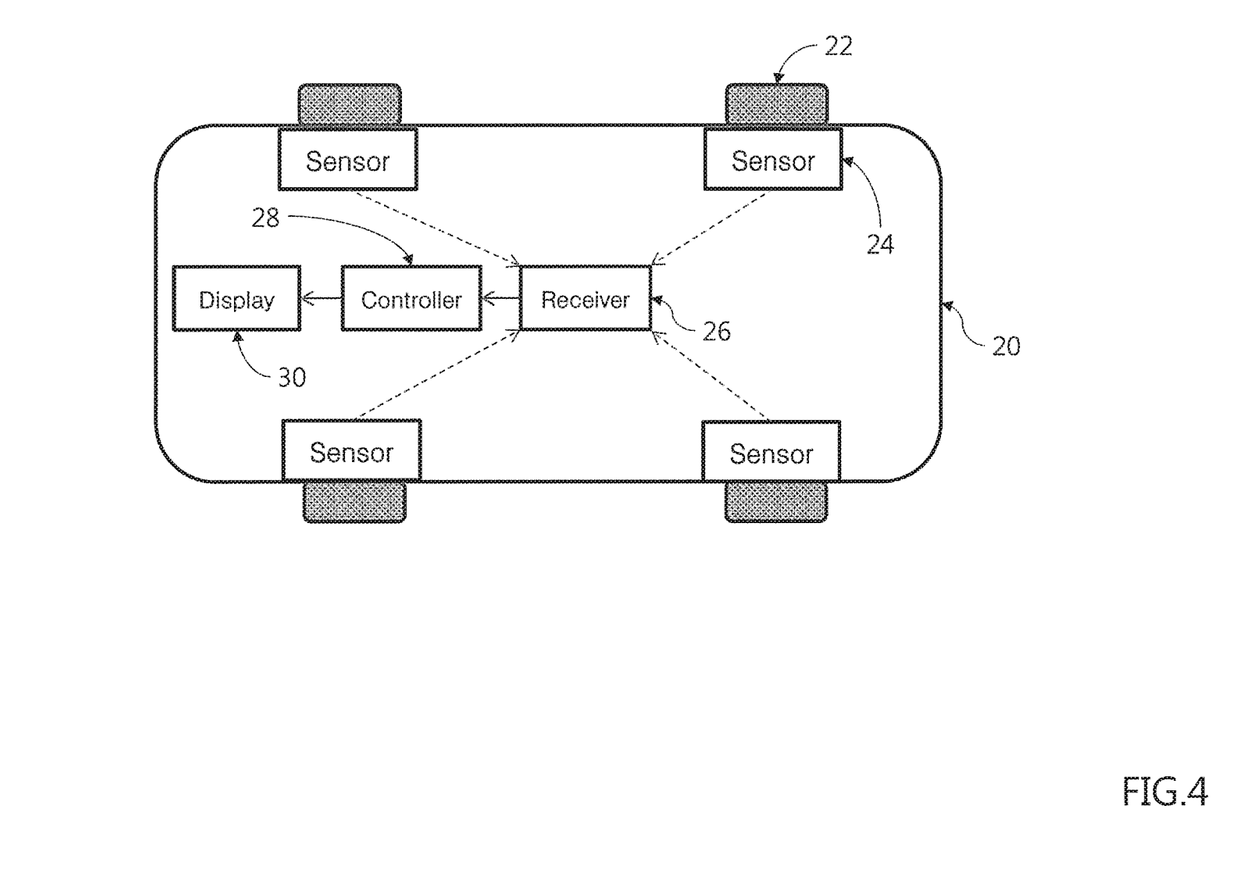
FIG. 4 shows a TPMS according to the present disclosure.

FIG. 4 shows a tire pressure monitoring system (TPMS) according to the present disclosure.

As shown, the TPMS included in a vehicle 20 may include a plurality of sensors 24, a receiver 26, and a controller 28. The plurality of sensors 24 are individually configured to measure an air pressure inside each tire 22 engaged with the respective sensor. The receiver 26 is configured to collect the air pressure from the plurality of sensors 24 and to transmit collected values to the controller 28. The controller 28 is configured to determine whether the air pressure inside each tire 22 is lower than a warning threshold level based on the collected values delivered from the receiver 26. If at least one tire 22 has a lower pressure than the warning threshold level, the controller 28 provides a warning sign regarding a tire 22 having a hysteresis air pressure which is ranged between the warning threshold level and a normal pressure level. In FIG. 4, the vehicle 20 is equipped with four tires 22. If the vehicle 20 has more than four tires, the number of sensors 24 increase by as much as tires are included.

Even if an air pressure of a tire increases from a lower level to a higher level than the warning threshold level while the vehicle operates, the controller 28 may display the warning sign regarding the tire having the hysteresis air pressure (i.e., a level between the warning threshold level and a normal pressure level) via a display 30.

Further, the controller 28 may release the warning sign regarding the tire when an air pressure inside the tire is beyond the normal pressure level.

In a case when there is no tire having an air pressure lower than the warning threshold level, the controller 28 may release the warning sign for the tire having the hysteresis air pressure.

After a vehicle starts (e.g., an engine powers on), the plurality of sensors 24 measure the air pressure inside tires periodically until the engine turns off. For example, each sensor 24 measures the air pressure inside each tire every 30 seconds or every 1 minute.

Since each tire 22 continuously rotates while the vehicle operates, it is hard connect each sensor 24 engaged with each tire 22 with the receiver 26 over wires. Thus, the plurality of sensors 24 and the receiver 26 are coupled via a wireless communication channel/link based on a wireless local area network. Wireless communication technologies for communicating each sensor 24 with the receiver 26 include a Bluetooth, a Low Power Bluetooth, a ZigBee, a RFID, a Wi-Fi, and so on.

The TPMS according to the present disclosure may further include the display 30 configured output the warning sign via at least one of a dashboard and a screen of multimedia system included in the vehicle. The display 30 may display the warning sign with a number indicating the air pressure inside the tire 22. The warning sign can include at least one of a color, a symbol, a sound, and a text, which are distinguishable from those of a normal sign provided to the tire 22 having a higher air pressure than the normal pressure level.

FIGS. 5A-5G describe an operation of a TPMS. Particularly, FIGS. 5A-5G describe plural situations happened according to the change of air pressures inside tires while the vehicle moves. Further, each situation may occur randomly, but not sequentially. For the purpose of showing only an example of possible issues or problem in the TPMS, it is assumed that these situations in FIGS. 5A-5G are incurred sequentially. In the TPMS, all of tires having an air pressure in the hysteresis loss section are considered low so that the warning sign is not assigned into a tire having a higher air pressure than another tire to which the warning sign is not assigned.

Herein, the air pressure inside tire uses a pound force per square inch (PSI). For example, it can be assumed that a warning threshold level of tires is 25 psi while a normal pressure level is 30 psi. Herein, the normal pressure level can be considered a reference level where a tire is released from a warning sign. Further, it can be assumed that a recommended pressure level of tire is 32 psi.

Figure 5A:
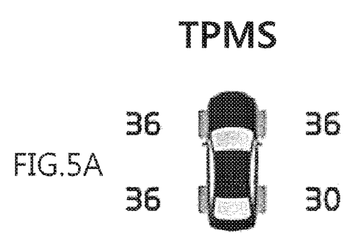
FIGS. 5A-5H describe operations of a TPMS according to the present disclosure.

Referring to FIG. 5A, after the vehicle travels for a predetermined distance, air pressures inside front tires increase up to 36 psi. However, an air pressure inside a right rear tire is 30 psi while an air pressure inside a left rear tire. Though the right rear tire has 30 psi of air pressure, a warning sign is not given regarding all tires because all tires including the right rear tire have higher air pressures than the warning threshold level.

Figure 5B:
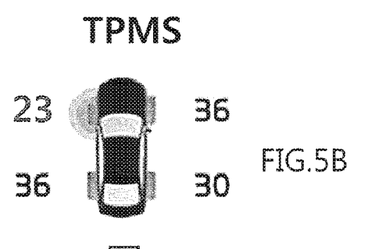

As shown in FIG. 5B, the air pressure inside the left front tire decreases to 23 psi. In this case, since the left front tire has a lower air pressure than the warning threshold level (i.e., 23 psi<25 psi), the warning sign is provided regarding the left front tire. However, because each of other three tires has a higher air pressure than the warning threshold level, the warning sign is not provided for these three tires.

Figure 5C:
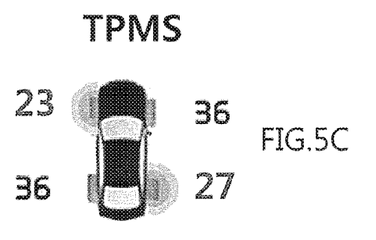

Referring to FIG. 5C, an air pressure inside the right rear tire decreases to 27 psi. In this case, the left front tire has a lower air pressure than the warning threshold level (23 psi<25 psi). Accordingly, even if the right rear tire still has a higher air pressure than the warning threshold level (i.e., 27 psi>25 psi), the warning sign is still given the right rear tire because the right rear tire has a lower air pressure than the normal pressure level (i.e., 27 psi 30 psi).

Figure 5D:
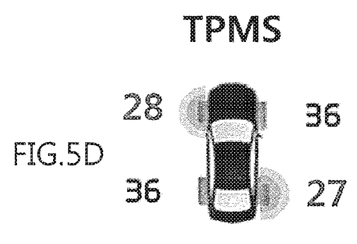

As shown in FIG. 5D, an air pressure inside the left front tire increase up to 28 psi. However, since the left front tire has a lower air pressure than the normal pressure level (i.e., 28 psi<30 psi), the warning sign for the left front tire is not released but kept. Likewise, the warning sign regarding the right rear tire having a lower air pressure than the normal pressure level (i.e., 27 psi<30 psi) can be kept. Accordingly, the TPMS can be distinguishable from one shown in FIGS. 1A-1D, because it can be avoided that the warning sign is provided regarding the left front tire while not provided regarding the right rear tire although the left front tire has a higher air pressure than the right rear tire.

Figure 5E:
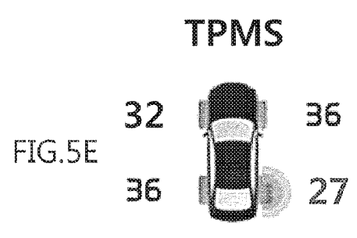

Referring to FIG. 5E, the air pressure inside the left front tire increases up to 32 psi. Since the left front tire has a higher air pressure than the normal pressure level (i.e., 32 psi>30 psi), the warning sign regarding the left front tire can be released. However, because the right rear tire has a lower air pressure than the normal pressure level (i.e., 27 psi<30 psi), the warning sign regarding the right rear tire may be still maintained.

Figure 5F:
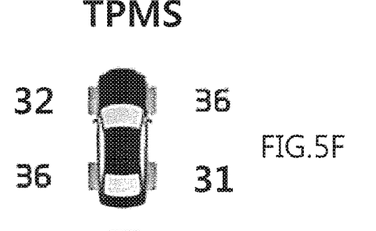

As shown in FIG. 5F, the air pressure inside the right rear tire increase up to 31 psi. Similar to FIG. 5E, since the right rear tire has a higher air pressure than the normal pressure level (i.e., 31 psi>30 psi), the warning sign regarding the right rear tire may be released.

Figure 5G:
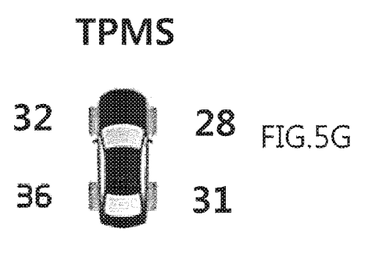

Referring to FIG. 5G, the air pressure inside the right front tire decreases to 28 psi, which can be distinguishable from a situation shown in FIG. 5C. Although the right front tire has a lower air pressure than the normal pressure level (i.e., 28 psi<30 psi), the warning sign may not be provided because all of other tires have a higher air pressure than the warning threshold level.

Figure 5H:
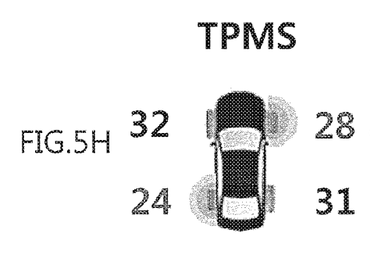

Referring to FIG. 5H, the air pressure inside the left rear tire decreases to 24 psi. Because the left rear tire has a lower air pressure than the warning threshold level (i.e., 24 psi<25 psi), the warning sign can be given. Further, when the warning sign is provided regarding the left rear tire, the warning sign can be also assigned to the right front tire because the right front tire has a lower air pressure than the normal pressure level (i.e., 28 psi<30 psi).

As above described, a situation, in which a TPMS wrongly determines a tire having a lower pressure is normal while displaying a warning sign regarding another tire having a higher pressure than the tire can be avoided, and thus, air pressures inside tires are properly detected even when the air pressures are continuously changed because of hysteresis loss.

When the TPMS provides accurate information about an air pressure inside each tire, a vehicle can support driving safety and a driver can receive proper information about maintenance of his or her vehicle.

The aforementioned embodiments are achieved by combination, of structural elements and features of the invention in a predetermined manner. Each of the structural elements or features should be considered selectively unless specified separately. Each of the structural elements or features may be carried out without being combined with other structural elements or features. Further, some structural elements and/or features may be combined with one another to constitute the embodiments of the invention. The order of operations described in the embodiments of the invention may be changed. Some structural elements or features of one embodiment may be included in another embodiment, or may be replaced with corresponding structural elements features of another embodiment. Moreover, it will be apparent that some claims referring to specific claims may be combined with another claims referring to the other claims other than the specific claims to constitute the embodiment or add new claims by means of amendment after the application is filed.

Various embodiments may be implemented using a non-transitory machine-readable medium having instructions stored thereon for execution by a processor to perform various methods presented herein. Examples of possible machine-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the invention without departing from the spirit or scope of the inventions. Thus, it is intended that the invention covers the modifications and variations of this invention provided they come within the scope of the appended claims and their equivalents.

What is claimed is:

1. A method for controlling a tire pressure monitoring system (TPMS) in a vehicle, the method comprising:
   measuring an air pressure of each of tires included in the vehicle;
   determining whether the air pressure of each of the tires is lower than a warning threshold level;
   providing a warning sign when at least one tire has an air pressure lower than the warning threshold level; and
   when the air pressure of the at least one tire is lower than the warning threshold level, providing a warning sign regarding another tire having a hysteresis air pressure which is ranged between the warning threshold level and a normal pressure level.

2. The method according to claim 1, wherein, even when the air pressure of the at least one tire increases from a lower level to a higher level than the warning threshold level while the vehicle travels, the warning sign is provided regarding the other tire having the hysteresis air pressure.

3. The method according to claim 1, further comprising:
   releasing the warning sign for the at least one tire when the air pressure of the at least one tire is higher than the normal pressure level.

4. The method according to claim 1, further comprising:
   releasing the warning sign for the other tire which has the hysteresis air pressure when there is no tire having an air pressure lower than the warning threshold level.

5. The method according to claim 1, wherein the normal pressure level is lower than a recommended pressure level for each tire included in the vehicle and higher than the sum of the warning threshold level and a pressure level that is increased due to hysteresis loss while the vehicle travels.

6. The method according to claim 1, wherein the step of measuring the air pressure of each tire periodically repeats from a time point at which an engine starts to a time point at which the engine is off.

7. The method according to claim 1, wherein the air pressure of each tire is measured by a temperature pressure sensor which is engaged with each tire.

8. The method according to claim 1, wherein the warning sign is displayed on at least one of a dashboard and a screen of multimedia system included in the vehicle.

9. The method according to claim 8, wherein the warning sign is displayed with a number, which indicates the air pressure inside each tire, and
   wherein the warning sign includes at least one of a color, a symbol, a sound, and a text distinguishable from a normal sign provided regarding a tire having a higher air pressure than the normal pressure level.

10. An apparatus for operating a tire pressure monitoring system (TPMS) that is engaged with an automotive electronics system, the automotive electronics system comprising a processor that comprises at least one data processor and at least one non-transitory computer-readable memory storing a computer program, wherein the processor causes the apparatus to:
    measure an air pressure of each of tires included in the vehicle;
    determine whether the air pressure of each tire is lower than a warning threshold level;
    provide a warning sign regarding at least one tire of which the air pressure is lower than the warning threshold level; and
    when the at least one tire has a lower pressure than the warning threshold level, provide a warning sign regarding another tire having a hysteresis air pressure which is ranged between the warning threshold level and a normal pressure level.

11. The apparatus according to claim 10, wherein the processor further causes the apparatus to release the warning sign regarding the other tire which has the hysteresis air pressure when there is no tire having an air pressure lower than the warning threshold level.

12. A tire pressure monitoring system (TPMS) in a vehicle, comprising:
   a plurality of sensors, each of which configured to measure an air pressure inside a tire engaged with the respective sensor;
   a receiver configured to collect the air pressure of each tire from the plurality of sensors and to transmit collected air pressure; and
   a controller configured to determine whether the air pressure inside each tire is lower than a warning threshold level based on the collected air pressure transmitted from the receiver,
   wherein, when at least one tire has a lower air pressure than the warning threshold level, the controller provides a warning sign regarding the at least one tire, and
   when the at least one tire has a lower air pressure than the warning threshold level, the controller provides a warning sign regarding another tire having a hysteresis air pressure which is ranged between the warning threshold level and a normal pressure level.

13. The apparatus according to claim 12, wherein, even when the air pressure of the at least one tire increases from a lower level to a higher level than the warning threshold level while the vehicle travels, the controller provides the warning sign regarding the other tire having the hysteresis air pressure.

14. The apparatus according to claim 12, wherein the controller releases the warning sign when the air pressure of the at least one tire is higher the normal pressure level.

15. The apparatus according to claim 12, wherein the controller releases the warning sign regarding the other tire having the hysteresis air pressure when there is no tire having an air pressure lower than the warning threshold level.

16. The apparatus according to claim 12, wherein the normal pressure level is lower than a recommended pressure level for each tire that is included in the vehicle and higher than the sum of the warning threshold level and a pressure level increased due to hysteresis loss while the vehicle travels.

17. The apparatus according to claim 12, wherein the plurality of sensors measure the air pressure inside each tire periodically while an engine runs.

18. The apparatus according to claim 12, wherein the plurality of sensors are coupled to the receiver via a wireless local area network.

19. The method according to claim 12, wherein the warning sign is displayed on at least one of a dashboard and a screen of multimedia system included in the vehicle.

20. The apparatus according to claim 19, wherein the warning sign is shown with a number indicating an air pressure inside a tire, and
   wherein the warning sign includes at least one of a color, a symbol, a sound, and a text distinguishable from a normal sign provided for a tire having a higher air pressure than the normal pressure level.

* * * * *